Patented Aug. 8, 1950

2,518,191

UNITED STATES PATENT OFFICE 2,518,191

METHOD FOR GRANULATING DDT

Norman E. Searle and Albert L. Flenner, Wilmington, Del., assignors to E. I. du Pont de Nemours & Company, Wilmington, Del., a corporation of Delaware No Drawing. Application February 7, 1946, Serial No. 646,220

3 Claims. (Cl. 167—42)

This invention relates to improvements in the manufacture of 2,2-bis(4-chlorophenyl)-1,1,1-trichloroethane, more commonly known as DDT. It is particularly directed to processes of granulating DDT in which the DDT while in a fused state is dispersed in water at a temperature above the fusion point of the DDT and the dispersion thus formed cooled with agitation to a temperature below the fusion point of the product.

It is an object of this invention to provide processes for obtaining DDT in a granular form. It is a further object to provide processes by means of which crude fused DDT can be converted to a particulate solid, free-flowing product. It is a still further object to provide processes whereby DDT and a powdered inert diluent can be combined and obtained in the form of a granular product. Further objects will become apparent hereinafter.

The foregoing and other objects of the invention are attained by dispersing fused DDT in water at a temperature above the fusion point of the DDT and cooling the dispersion with agitation to a temperature below the fusion point of the product.

The DDT from which the granulated product is formed according to this invention is obtained commercially by the condensation of chloral-yielding compounds and chlorobenzene in the presence of sulfuric acid. The crude product thus formed is a mixture of several isomers together with relatively small proportions of side reaction products. The mixture has no sharp melting point and the molten product tends to supercool and become sticky at relatively low temperatures, usually forming a waxy mass at room temperature. The preparation of a particulate free-flowing product from such a material has presented difficulties.

While this invention is particularly applicable to processes for the granulation of crude DDT, it is in its broader aspects applicable to the purified product which may be obtained from the crude by relatively complicated crystallization processes.

In carrying out the processes of our invention, we first effect a dispersion of DDT in water at a temperature above the fusion point of DDT. To effect this dispersion we employ agitation and may include in the water an emulsifying agent.

Typical of the emulsifying agents suitable for use in the processes of the invention are the sulfated higher alcohols and their water-soluble salts, the alkali metal or amine salts of oleic acids, the sulfonated animal and vegetable oils, such as sulfonated fish or castor oils, the sulfonated petroleum oils, and others as set out in detail in Bulletin E-607, Bureau of Entomology and Plant Quarantine, Department of Agriculture.

The amount of emulsifying agent required is extremely small, as will be seen in the examples to follow, and may be varied as desired depending upon the particular emulsifying agent used, the intensity of agitation employed, and the quality and amount of DDT in the dispersion to exert the desired effect on the size of DDT granules to be obtained.

Maintaining agitation sufficient to preclude agglomeration, the dispersion is then gradually cooled to a temperature below the fusion point of DDT. By effecting cooling while the DDT is dispersed in water, the rate of cooling may be uniformly and easily regulated so as to prevent undercooling and thus avoid the formation of a sticky or wax-like material. The cooling may be attained either by natural dissipation of heat or by means of a cooling jacket or coil, or by passing the dispersion thru a heat exchanger. Localized or too rapid cooling should be avoided, however, because the product tends to undercool and agglomerate on cold surfaces. Uniform, controlled cooling may be effected by placing the dispersion under vacuum and evaporating off water at a suitable rate.

An additional factor governing the successful operation of these processes is a critical temperature range between the limits, 70° C. and 85° C. Too rapid cooling thru this critical range will cause the product to undercool so that the dispersed particles of fused DDT become viscous and sticky and tend to agglomerate. It has been found by regulation of rate of cooling thru this temperature range that the emulsified DDT can be solidified to yield granules without excessive agglomeration. The rate of cooling can be increased without causing agglomeration as the agitation is improved, but as a practical operating limit, however, at least ten minutes are required to effect satisfactory granulation using vigorous agitation in the usual commercial equipment. One may, of course, by the use of unusual means of achieving extreme agitation, such as turbulence tubes, reduce the cooling time still further.

The temperature to which the dispersion should be cooled to obtain a satisfactory granular product will vary somewhat with the quality of DDT, the state of dispersion and the cooling time down to and below 70° C. It is generally preferred to continue agitation and cooling of the dispersed DDT until the temperature of the mass is at most about 55° C. in order to obtain the DDT in a form of relatively hard discrete particles which can be readily separated from the aqueous solution and dried to yield a free-flowing granular product.

Factors governing the size of the DDT granules obtained by the processes of our invention are intensity of agitation, speed of cooling, concentration of DDT in the cooling mass, and the concentration and kind of emulsifying agent employed. For example, poor agitation, rapid cooling, and high concentration of DDT in the cooling mass each act to give large granules. By adjusting these variables, the state of granulation can be modified within certain limits. A granulated product resembling Cream of Wheat will be fairly small size, one resembling Minute Tapioca medium size, and one resembling tapioca very large. Thus the diameter of the granules may be varied from about 0.075 mm. to about 3 mm.

According to another aspect of our invention we include in the dispersion of fused DDT in water a small amount of a protective colloid, such as gelatin, cornstarch, egg albumin, gum arabic, and gum karaya, as well as an emulsifying agent. The presence of the protective colloid has been found to decrease further the tendency for the DDT particles to agglomerate during cooling. The effectiveness of the protective colloid in decreasing the tendency of the DDT to agglomerate during cooling is enhanced by the addition of a small amount of hydrochloric acid or sodium chloride. This modification has particular merit in large scale utilization of the processes of this invention, since extremely vigorous agitation of the intensity required otherwise to prevent agglomeration is not generally available in large scale equipment.

The amount of protective colloid and hydrochloric acid or sodium chloride used may be varied as desired with the other variables to obtain a product of a desired degree of granulation, but in any event the amounts required are extremely small. For example, we have found that DDT can be obtained in small uniform granules from an aqueous emulsion comprising about 25 per cent by weight DDT using only about 0.25 per cent by weight of gelatin as a protective colloid, about 0.025 per cent by weight of 100 per cent hydrochloric acid, and, in addition, about 0.15 per cent by weight of an emulsifying agent known to the trade as MP-189-SX, the latter believed to contain a 50 per cent solution of the sodium salt of a long-chain hydrocarbon sulfonate.

According to still another aspect of our invention, we add to the fused DDT in water at least 20 per cent of a powdered, non-gel forming material and an emulsifying agent before granulating. In this method the presence of the inert material aids in preventing the formation of agglomerates during granulation and the presence of the protective colloid and hydrochloric acid or sodium chloride is not required. The product is obtained as granules of mixed DDT and inert. These granules can be comminuted much more easily than the undiluted granules to give a finely powdered material suitable for use in insecticidal compositions.

Typical of the non-gel forming inerts suitable for use in the latter embodiment of our invention are talc, china clay, pyrophyllite, celite, and tricalcium phosphate. The amount of inert used may be varied to yield any desired composition of DDT and inert in the granular product as long as the inert content is at least 20 per cent by weight of the finished product. Gel-forming clays, like bentonite, are not suitable because they induce agglomeration.

Our invention may be more fully understood by reference to the following examples.

*Example 1*

A mixture of 130 parts by weight of DDT in 430 parts by weight of water was heated to 90° C. to 95° C. To this was added 0.5 part by weight "Duponol" L-144WD (the sodium salt of a sulfated higher alcohol). The mixture was agitated with a high speed stirrer and allowed to cool to about 50° C. with stirring. Fine, white granules were filtered off and washed in water, dried over $P_2O_5$ and were observed to have a setting point of 86° C. The granules had a diameter of 2 to 3 mm.

*Example 2*

Into a 100-gallon jacketed Pfaudler vessel equipped with an agitator driven at 90 R. P. M. was charged 75 gallons of water and 200 lbs. of DDT, technical grade. The mixture was heated to about 95° C., melting the DDT. Two (2) lbs. of gelatin, 1.2 lbs. of MP-189-SX (the sodium salt of a long-chain hydrocarbon sulfonate, 50 per cent solution) and 257 cc. of 37 per cent hydrochloric acid solution were added to the DDT-water mixture with agitation to effect an emulsion of DDT in the water.

Cooling water was circulated thru the jacket of the vessel while maintaining agitation of the DDT emulsion, thereby cooling the DDT emulsion to about 50° C. in about 80 minutes. There were obtained small uniform granules of DDT of about 50 mesh size.

*Example 3*

One-hundred fifty (150) parts by weight of hot water containing 0.3 part by weight of MP-189-SX was added to 50 parts by weight of fused DDT at 95° C. The mixture was agitated with a high speed stirrer until a uniform dispersion was obtained. Then 12.5 parts by weight of talc were added, the temperature of the dispersion being 90° C. at this time. Stirring was continued and the dispersion allowed to cool to about 50° C. Fine, white granules formed. These granules, containing 80 per cent DDT and 20 per cent talc, were dried and found to have a particle size of 100 to 200 mesh.

We claim:

1. A process for granulating DDT which comprises dispersing fused DDT in water at a temperature above the fusion point of the DDT with the aid of an emulsifying agent, cooling the dispersion thus formed with agitation to a temperature of at most about 55° C., and regulating the cooling rate of the dispersion so that at least ten minutes are required to cool thru the range of 85° C. to 70° C.

2. A process for granulating DDT which comprises dispersing fused DDT in water at a temperature above the fusion point of the DDT with the aid of an emulsifying agent, gelatin, and hydrochloric acid, then cooling the dispersion thus formed with agitation to a temperature of at most about 55° C. and regulating the cooling rate of the dispersion so that at least ten minutes are required to cool thru the range of 85° C. to 70° C.

3. A process for obtaining a granulated DDT composition which comprises dispersing fused DDT and a powdered non-gel forming inert material in water at a temperature above the fusion point of the DDT with the aid of an emulsifying agent, said powdered non-gel forming material comprising at least 20 per cent by weight of the dispersed phase and being selected from the group consisting of talc, pyrophyllite, celite, and tricalcium phosphate, cooling the dispersion thus formed with agitation to a temperature of at most about 55° C., and regulating the cooling rate of the dispersion so that at least ten minutes are required to cool thru the range of 85° C. to 70° C.

NORMAN E. SEARLE.
ALBERT L. FLENNER.

REFERENCES CITED

The following references are of record in the file of this patent:

UNITED STATES PATENTS

| Number | Name | Date |
|---|---|---|
| 2,190,922 | Heath | Feb. 20, 1940 |
| 2,420,295 | Biehn | May 13, 1947 |
| 2,423,457 | Lynn | July 8, 1947 |
| 2,429,839 | Muller | Oct. 28, 1947 |
| 2,442,760 | Dieter | June 8, 1948 |

FOREIGN PATENTS

| Number | Country | Date |
|---|---|---|
| 196,012 | Great Britain | Apr. 16, 1923 |
| 200,702 | Great Britain | July 19, 1923 |
| 547,871 | Great Britain | Sept. 15, 1942 |